United States Patent [19]

Maus

[11] 3,924,473

[45] Dec. 9, 1975

[54] BALANCING APPARATUS, ESPECIALLY WHEEL BALANCING APPARATUS

[75] Inventor: Otfrid Maus, Darmstadt, Germany

[73] Assignee: Firma Carl Schenck AG, Darmstadt, Germany

[22] Filed: Feb. 27, 1975

[21] Appl. No.: 553,596

[30] Foreign Application Priority Data

Nov. 11, 1974  Germany............................ 2453292

[52] U.S. Cl..................................... 73/471; 73/487
[51] Int. Cl.²......................................... G01M 1/22
[58] Field of Search...................... 73/460, 462–466, 73/472, 459, 471, 487

[56] References Cited
UNITED STATES PATENTS

| | | | |
|---|---|---|---|
| 3,605,502 | 9/1971 | Hack...................................... | 73/471 |
| 3,812,725 | 5/1974 | Frank et al............................ | 73/462 |

FOREIGN PATENTS OR APPLICATIONS

| | | | |
|---|---|---|---|
| 867,872 | 5/1961 | United Kingdom................... | 73/471 |

Primary Examiner—James J. Gill
Attorney, Agent, or Firm—Wolfgang G. Fasse; Willard W. Roberts

[57] ABSTRACT

In the present wheel balancing apparatus the bearing means which support a vertically rotatable shaft for the body to be balanced, are in turn supported by a leaf spring frame structure connected to a base. The leaf spring frame includes an inverted U-shaped spring member, the legs of which are connected to the base member, and the horizontal torsion spring member of which supports the bearing means. Bending spring means, especially flat leaf spring means interconnect the bearing means with the legs of the U-shaped spring means at a predetermined distance from the base, whereby such distance influences the stiffness of the spring system. Measuring transducer means are rigidly supported on the base in such a position as to sense unbalance values from said bearing means in at least two planes.

11 Claims, 7 Drawing Figures

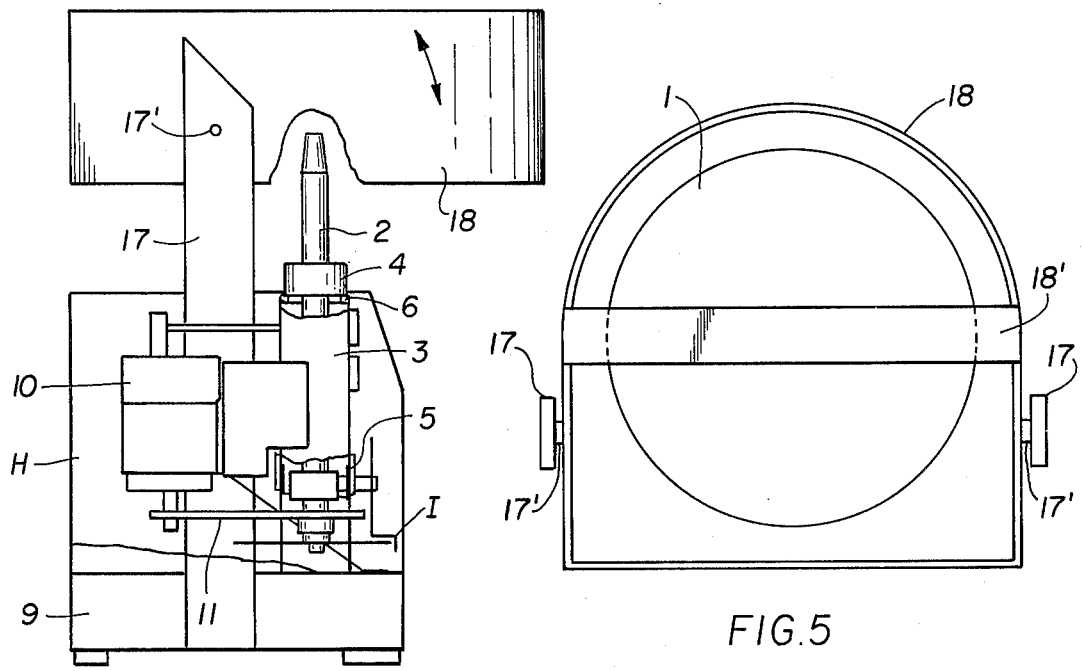
FIG. 3
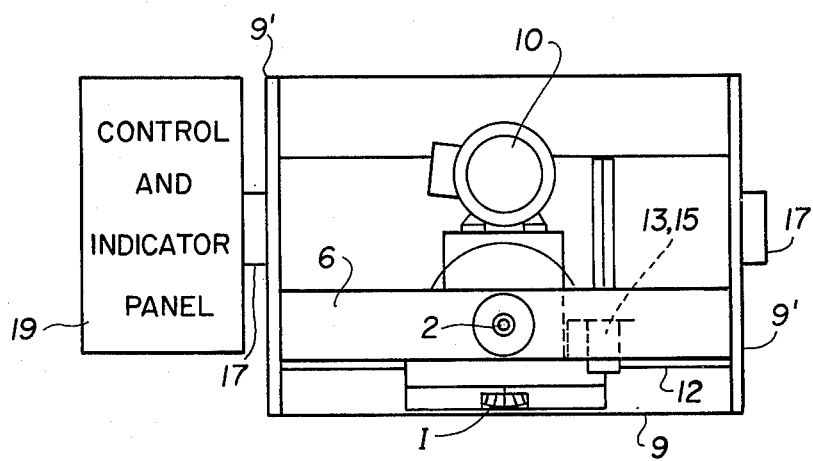
FIG. 5
FIG. 4
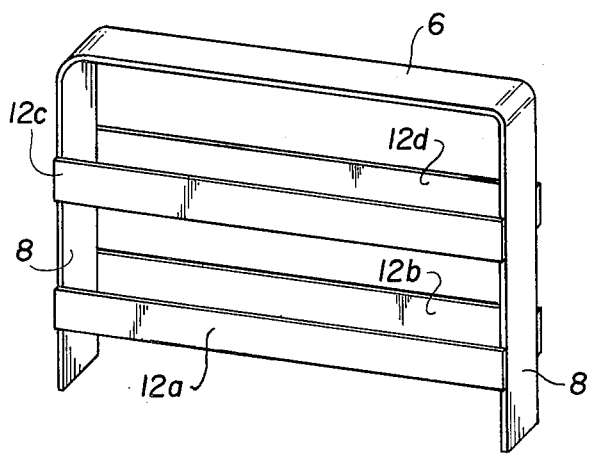
FIG. 6
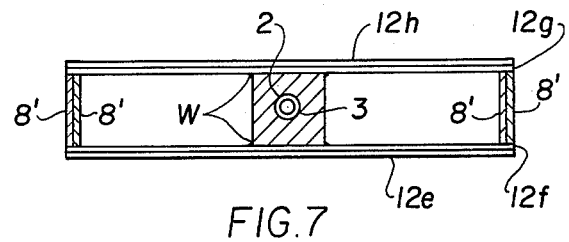
FIG. 7

BALANCING APPARATUS, ESPECIALLY WHEEL BALANCING APPARATUS

BACKGROUND OF THE INVENTION

The present invention relates to a balancing apparatus, especially a wheel balancing apparatus, which is subcritically tuned and wherein a rotatable shaft for rotating a body to be balanced is arranged in a vertical position, whereby the balancing may be accomplished in two planes of the body to be balanced. A spring system in the form of a frame supports the bearing means for said rotatable shaft. Vertically extending spring legs of the spring system are connected to the base of the apparatus and two measuring transducers are also rigidly connected to the base.

German Pat. No. 2,215,002 describes a balancing apparatus of this type in which both vertical legs of the frame comprise spring rods which are interconnected by a rigid horizontal cross bar which should be as stiff as possible. The rigid, stiff horizontal cross bar supports the bearing means for the body to be balanced. The vertical spring rods are deformed in this known apparatus by an unbalance moment as well as by a simple unbalance force, the latter representing a static unbalance. However, the stiff horizontal cross bar is not deformed by such unbalance moment nor by the static unbalance force. Thus, in the known apparatus, it is not possible to provide a separate tuning of the oscillatory behavoir relative to an unbalance moment on the one hand and relative to a static unbalance on the other hand. Further, in order to provide a sufficient stiffness of the frame structure of the known apparatus in the plane defined by the frame, that is in the plane extending perpendicularly to the measuring direction, it is necessary to make the vertical spring rods also relatively stiff. Thus, the entire structure becomes relatively stiff and heavy, especially since the substantially stiff cross bar which interconnects the spring rods makes it necessary to construct the entire frame from relatively thick and thus heavy structural elements. Moreover, the spring characteristic or the spring behavoir of this known balancing apparatus is not isotropic. Stated differently, the spring stiffness is not uniform in its effect in different directions extending from a coupling point or location in which a transducer is located for sensing unbalance values.

OBJECTS OF THE INVENTION

In view of the above, it is the aim of the invention to achieve the following objects singly or in combination:

to avoid the drawbacks of the prior art, more specifically to construct a balancing machine as a relatively light and compact structure in such a manner that a substantially isotropic oscillatory behavoir is achieved for the two measuring transducers for the unbalance moment and for the static unbalance;

to construct a balancing apparatus, especially a wheel balancing machine in such a manner that substantially equal resonance values may be achieved separately for a bending load, as well as for a torsion moment load;

to arrange the spring supporting system of a balancing machine in such a manner that the stiffness of the system may be varied by simple expedience, for example, by locating certain spring members of the system into a different position;

to provide an effective tuning possibility of the spring characteristic or behavoir relative to the three degrees of freedom;

to construct the spring supporting system in such a manner that the forces necessary for driving the body to be balanced will not influence the measuring results; and to provide a safety bail which will prevent injuries to an operator of the apparatus.

SUMMARY OF THE INVENTION

According to the invention there is provided a subcritically tuned balancing apparatus for balancing a test body rotating on a vertically arranged rotational axis, said balancing taking place in two planes, whereby the bearing means for the rotational axis are supported by a frame spring system having vertical spring legs connected to a base of the apparatus which also supports two measuring transducers. The spring frame comprises an inverted U-shaped bail having a horizontal member which supports the bearing means or housing for the rotational axis and which constitutes a torsion spring. The bearing means for the rotational axis are also connected to the vertical legs by means of at least two additional horizontally extending bending springs. Preferably, the horizontally extending torsion spring member and the vertically extending spring legs form an integral leaf spring unit.

The just described arrangement according to the invention has the advantage that it is possible to influence or control the oscillatory behavior of the spring system, especially its resonance, simply by selecting the size and the arrangement of the horizontally extending bending springs, whereby the influence or control may be such that for both types of loads, namely, bending loads and torsion loads, substantially the same resonance values may be achieved. Especially for the static unbalance, it is now possible to achieve a substantially complete isotropism at the point of the respective measuring transducer. Similarly, at the location of the measuring transducer for the unbalance moment, it is now possible to achieve a good approximation to the complete isotropism. Moreover, the resonance of the horizontally extending bending springs may be adjusted to a desired frequency in a cross direction, that is in the plane defined by the spring bail having the inverted U-shape. Thus, by selecting the shape and the arrangement of the horizontally extending bending springs, it is possible to adjust the resonance in the three degrees of freedom. Moreover, in the apparatus of the invention, the upper bearing for the rotatable shaft may be supported substantially in an isotropic manner. The upper bearing of the bearing means is closest to the body to be balanced and the isotropic support of the bearing is advantageous in eliminating factors, which otherwise might undesirably influence the measured results.

An especially advantageous embodiment of the invention arranges the horizontally extending bending springs in an on edge position, whereby leaf springs are used, the plane of which extends vertically. The thickness of the leaf springs influences the torsion spring constant linearly whereas the height of the leaf springs influences the spring stiffness in the plane of the inverted U-shaped bail in a cubic manner, that is with the power of three. This feature has the advantage that a tuning of the spring behavior relative to the individual degrees of freedom is possible while simultaneously substantially eliminating any mutual or cross influences. Further, the stiffness relative to a motion in the plane defined by said spring bail may be adjusted in a rather simple manner by varying the spacing of the horizontally extending leaf springs relative to the base of the balancing apparatus.

BRIEF FIGURE DESCRIPTION

In order that the invention may be clearly understood, it will now be described, by way of example, with reference to the accompanying drawings, wherein:

FIG. 3 shows a schematic side view of the apparatus according to the invention again omitting non-essential parts;

FIG. 4 shows a schematic top view of the present apparatus omitting the safety bail shown in FIG. 3;

FIG. 5 is a top view on a somewhat reduced scale of the safety bail;

FIG. 6 shows on a smaller scale a modification of the supporting spring system shown in FIG. 1; and FIG. 7 shows a sectional view through a further modification of the supporting spring system also on a smaller scale.

DETAILED DESCRIPTION OF EXAMPLE EMBODIMENTS

Figure 1:
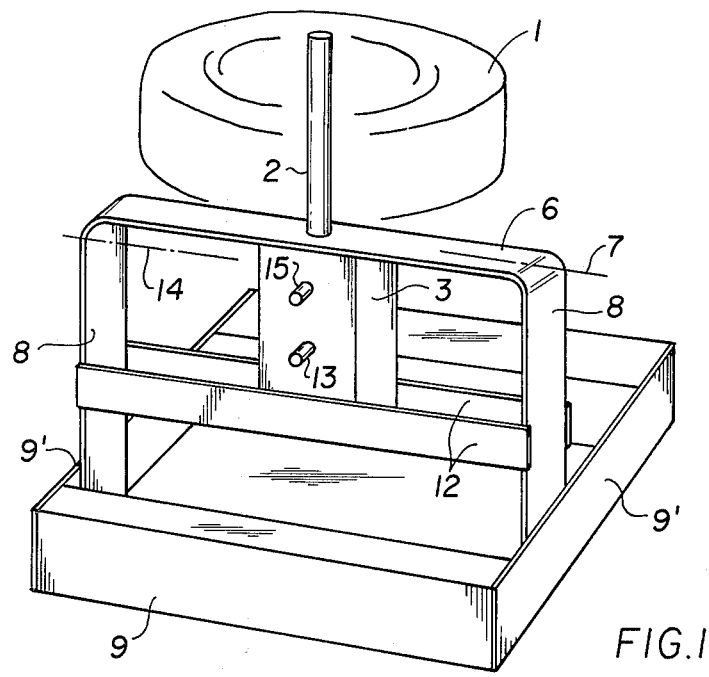
FIG. 1 is a somewhat simplified perspective view of an apparatus according to the invention, whereby the outer housing and certain details have been omitted for simplicity's sake, thus mainly showing the spring system for supporting the bearing means for the body to be balanced.

The test body 1 to be balanced, for example a vehicle wheel, is secured to the free end of a vertically supported rotatable shaft or spindle 2. The shaft 2 is supported for rotation in bearing means 3 comprising an upper bearing 4 adjacent to the wheel 1 and a lower bearing 5 adjacent to the drive means for the spindle 2, see FIG. 3.

The bearing means include a substantially rectangular housing 3, which is supported by a spring system comprising an inverted U-shaped spring bail 7 having a flat horizontal spring leaf member 6 and vertical legs 8 also in the form of flat leaf springs. The spring legs 8 are connected with their lower ends to the sides 9' of a machine base 9, for example, by welding or by nuts and bolts not shown. The upper ends of the spring legs 8 preferably form an integral structure with the horizontal spring leaf member 6. However, the spring elements 6 and 8 may also be welded together from initially separate spring sections.

The bearing housing 3 supports a drive motor 10 for rotating the test body 1. The motor 10 is connected by means of a belt and pulley arrangement 11 to the spindle 2. Two measuring transducers 13 and 15 are coupled to the bearing housing 3, whereby the upper measuring transducer 15 ascertains the static unbalance, whereas the lower measuring transducer 13 ascertains the unbalance moments.

The bearing housing 3 is secured to the lower surface of the horizontal spring member 6 in a suspended manner and two leaf springs 12 are for example, welded or secured by means of threaded bolts to the bearing housing 3 substantially intermediate the ends of these leaf springs 12. The ends of the leaf springs 12 are secured to the vertical spring legs 8 in such a manner that the leaf springs 12 are arranged on edge. In other words, the plane of each leaf spring 12 extends vertically and thus substantially in parallel to the plane defined by the spring bail 7 comprising the horizontal spring member 6 and the legs 8. The outer ends of the springs 12 may, for example, also be welded or screwed to the sides of the legs 8. The spacing of the leaf springs 12 from the base 9 is preferably smaller than the spacing between the springs 12 and the horizontal spring member 6 of the bail 7.

It is especially advantageous to employ two pairs of leaf springs 12 as shown in FIGS. 6 and 7. The spring leaf pairs interconnect the bearing housing 3 with the legs 8 as shown in FIG. 1. However, the bending springs 12 are arranged in double pairs, preferably extending in parallel to each other. This arrangement requires but a few pieces of spring leaf material and surprisingly provides an especially effective possibility of adjusting the spring behavoir or the spring characteristic in the three degrees of freedom. In the arrangement of FIG. 6 the first pair of bending springs comprises leaf springs 12a and 12b. The second pair of bending springs comprises leaf springs 12c and 12d. The ends of these leaf springs 12a to 12d are, for example, welded to the edges of the vertical legs 8 and the bearing housing 3 is secured intermediate the ends to each of these leaf springs. This arrangement has the advantage that the loads transmitted between the bearing housing 3 and the bending leaf springs are reduced since the loads are distributed over a plurality of such leaf springs.

In the embodiment of FIG. 7, the leaf springs 12e and 12f form a laminated pair and the leaf springs 12h and 12g also form a laminated pair, which are secured to the bearing body 3, for example, by welding seams W, whereby the outer spring elements 12e and 12g may be bolted to the bearing housing 3.

As mentioned, the horizontal torsion spring member 6, as well as the vertical springs 8 are leaf springs, whereby the leaf spring legs 8 extend perpendicularly to the plane defined by the spring bail 7 and also perpendicularly across the horizontal plane of the torsion leaf spring member 6.

The just described spring arrangement provides the necessary stiffness or springiness in all directions. In addition, it is very light, since it requires but a few pieces of leaf spring material, so that the entire balancing machine is of a very light construction. By properly selecting the height and width of these leaf springs, it is possible to provide the desired tuning of the spring behavoir of each leaf spring in two planes.

Preferably the bearing housing 3 is of stiff construction for connection to the torsion leaf spring 6 and the horizontal bending leaf springs 12. The housing 3 may be sufficiently stiff and nevertheless of rather light construction. Further, the housing may be utilized for supporting the drive motor 10 for the spindle 2, as described above. This arrangement has the advantage of keeping the drive transmission means such as a belt rather short and thereby avoiding any drive transmission from the machine base 9 to the spindle 2.

The inverted U-shaped spring bail 7 and the horizontal leaf springs 12 are dimensioned in such a manner that the resonance will have substantially the same value when a bending load is applied, as well as when a torsional moment load is applied. Cross oscillations or parallel motions in the plane defined by the bail 7 are adjustable in the desired manner with regard to their resonance frequency by the selection of the height or rather the vertical dimension of the leaf springs 12. This feature of the invention makes it possible that the resonance of the spindle motion is adjustable in the three degrees of freedom. In addition, this arrangement achieves a substantially isotropic support of the upper bearing 4 adjacent to the test body 1.

Since the spindle 2 is supported in the bearing housing 3 it is rather simple to use the bearing housing 3 also as a support for the drive motor 10 as described above, whereby the advantage is achieved that the accuracy of the measuring results is not influenced by the drive means. This advantage is especially assured when the drive motor 10 and the spindle 2 may freely oscillate together, whereby the drive forces cannot influence the measured result.

In operation, the spring deformations in the three deformation degrees are sensed in order to measure the unbalance forces. The sensing is accomplished by the measuring transducers 13 and 15, which ascertain the relative motion between the bearing housing 3 and the machine base 9. The measuring transducers 13 and 15 are supported by a column 16 secured to the machine base 9 in a stiff manner. The measuring transducers 13 and 15 are located so as to cooperate with the bearing housing 3 for the sensing of said deformation forces.

When the spring system is subjected to a load caused by an unbalance moment, the horizontal spring member 6 of the bail 7 will act as a torsion spring. Due to the leaf springs 12 arranged on edge, the rotational axis 14 shown in FIG. 1 will be located somewhat below the spring member 6 and extends substantially at the same level as the measuring transducer 15. As a result, the measuring transducer 15 will not respond to an unbalance moment, but will ascertain only any deflection resulting from a static unbalance. On the other hand, the measuring transducer 13 will respond to an unbalance moment, since it is arranged at a level in which the tangent to the bending line at the upper end of the spring arrangement intersects the center line of the arrangement in its non-deflected condition. At this coupling point, the measuring transducer 13 will not respond to any deflections resulting from a static unbalance, but it will ascertain loads resulting from an unbalance moment.

In the illustrated embodiments of the spring system, the planes of the spring member 6 and the planes of the vertically extending spring legs 8 extend perpendicularly to the plane defined by the spring bail 7. The stiffness of the bail 7 is as such relatively small in the plane of the bail 7. However, such stiffness is substantially increased due to the parallel leaf springs 12 arranged on edge. In addition, the stiffness can be adjusted in a simple manner by selecting the spacing between the leaf springs 12 and the base 9 in order to achieve the desired resonance frequency also in this direction, thus achieving an isotropic support for the spindle 2 at the upper end of the housing 3.

Incidentally, as shown in FIG. 7, the bail 7 may be assembled from a plurality of laminated springs 8', each of which has the described inverted U-shape and which are assembled into packets. In still another embodiment, it is possible to replace the leaf springs by round rod springs or by hollow tubular springs. Any of these modifications permit a rather light construction of the apparatus, while simultaneously providing a sufficient stiffness in all desired directions.

Figure 2:
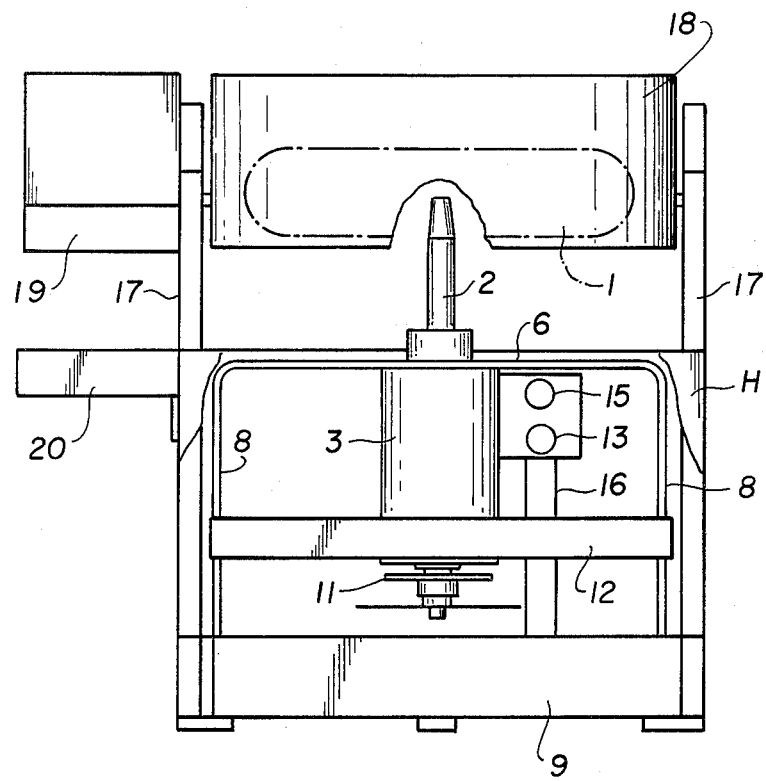
FIG. 2 is a schematic front view of the apparatus according to the invention, again substantially omitting the outer housing, but showing a safety bail and certain accessories not shown in FIG. 1.

The entire balancing apparatus is enclosed by a housing H. Only the spindle 2 extends out of the housing. To the right and left of the housing H there is secured a respective upright post 17. The upper end of the post 17 carries a safety bail or hood 18, which is journaled to the posts 17 by a journal axis 17', as best seen in FIG. 5. The hood 18 may include a cross cover piece 18' and is tiltable up and down as shown by the double arrow in FIG. 3. In the upwardly tilted position of the hood 18 the test body 1 may be secured to the top of the spindle 2. After securing the body 1 to the spindle 2, the hood is tilted downwardly to completely encase the body 1 as best seen in FIG. 2, thereby protecting the operator of the machine. A control and indicator panel 19 is laterally secured to one of the upright posts 17. Further, a tray 20 containing in several compartments an assortment of balancing weights, as well as the necessary tools, is also secured to one of the upright posts 17. The arrangement of the safety hood 18 may be such, that the machine can be switched on only when the hood 18 is in the horizontal or closed position, so that any danger which might result from centrifugally escaping portions of the body 1 is prevented.

An angular indicator I is arranged to be readable in front of the housing H. The indicator comprises a disk secured to the lower end of the spindle 2. The disk is provided with a dial which may be read through a window in the housing.

Further advantages of the present apparatus are seen in that a rapid adjustment may be accomplished without any reference tables or the like. The entire apparatus is rather compact and requires only about one square meter of space. Further, a wide range of wheel sizes may be balanced on the present machine, whereby both wheel sides are balanced simultaneously in a single measuring run, and it is not necessary to adjust angular values during the measuring run. All these features in combination make a balancing operation rather simple.

Although the invention has been described with reference to specific example embodiments, it is to be understood, that it is intended to cover all modifications and equivalents within the scope of the appended claims.

What is claimed is:

1. A wheel balancing apparatus comprising a base, inverted U-shaped support means including a horizontal member forming a torsion spring and vertically extending spring legs having lower ends secured to said base, said legs having upper ends interconnected by said horizontal torsion spring member, bearing means secured to said horizontal torsion spring member, a rotatable shaft for rotating a wheel to be balanced, said rotatable shaft being vertically supported by said bearing means, horizontally extending bending spring means interconnecting said bearing means with said vertically extending legs of said U-shaped support means, and measuring transducer means operatively arranged for sensing unbalance values of a wheel rotated by said rotatable shaft.

2. The apparatus according to claim 1, wherein said measuring transducer means comprise two transducers operatively arranged and supported on said bearing means for sensing unbalance values in two different planes, and wherein said horizontally extending bending spring means comprise at least two springs arranged opposite each other, one on each side of said vertically extending legs and spaced from said base at a predetermined spacing.

3. The apparatus according to claim 1, wherein said horizontally extending bending spring means comprise leaf springs arranged on edge so that the plane of a leaf extends substantially vertically and the longitudinal axis of a leaf extends horizontally.

4. The apparatus according to claim 1, wherein said horizontal torsion spring member has a downwardly facing surface, and wherein said bearing means comprise a bearing housing secured to said downwardly facing surface of said horizontal torsion spring member, said horizontally extending bending spring means being spaced from and arranged in parallel to said horizontal torsion spring member.

5. The apparatus according to claim 1, wherein said horizontally extending bending spring means comprise two pairs of leaf springs extending in parallel to each other and interconnecting said bearing means with said vertically extending spring legs.

6. The apparatus according to claim 1, wherein said horizontally extending bending spring means comprise two pairs of leaf springs extending from one vertical spring leg to the other vertical spring leg, and means rigidly securing said bearing means to said pairs of leaf springs substantially intermediate said vertical spring legs.

7. The apparatus according to claim 1, wherein said horizontal torsion spring member comprises a leaf spring having a plane extending horizontally, and wherein said vertically extending spring legs also comprise leaf springs each of which extends with its plane perpendicularly to the plane of said torsion leaf spring and across the torsion leaf spring at the ends thereof to form said inverted U-shaped support means.

8. The apparatus according to claim 1, wherein said bearing means comprise a stiff bearing housing, said torsion spring member and said horizontally extending bending spring means being secured to said stiff bearing housing, means rigidly securing said measuring transducer means to said base and coupling means operatively connecting said measuring transducer means to said stiff bearing housing for sensing unbalance values.

9. The apparatus according to claim 1, further comprising upright posts secured to said base and a safety hood journaled to said upright posts in such a location that the safety hood may be raised to an upper position for the insertion of a wheel to be balanced, and lowered to a lower position to cover said wheel.

10. The apparatus according to claim 1, wherein said bending spring means are laminated leaf spring means.

11. The apparatus according to claim 1, wherein said inverted U-shaped support means comprise a plurality of laminated leaf springs.

* * * * *